(12) United States Patent
McDonald et al.

(10) Patent No.: US 6,495,657 B1
(45) Date of Patent: *Dec. 17, 2002

(54) TWO DIMENSIONAL POLYAMIDES PREPARED FROM UNSATURATED CARBOXYLIC ACIDS AND AMINES

(75) Inventors: William F. McDonald, Utica, OH (US); Zhi Heng Huang, East Lansing, MI (US); Stacy C. Wright, Lansing, MI (US); Morris Danzig, Northbrook, IL (US); Andrew C. Taylor, Ann Arbor, MI (US)

(73) Assignee: Michigan Biotechnology Institute, Lansing, MI (US)

( * ) Notice: Subject to any disclaimer, the term of this patent is extended or adjusted under 35 U.S.C. 154(b) by 21 days.

This patent is subject to a terminal disclaimer.

(21) Appl. No.: 09/698,619

(22) Filed: Oct. 27, 2000

(51) Int. Cl.[7] .................. C08G 69/16; C08G 69/42; C08L 77/06; B32B 27/00
(52) U.S. Cl. .................. 528/310; 528/312; 528/313; 528/315; 528/316; 528/318; 528/322; 528/335; 525/50; 525/54.1; 525/54.2; 525/54.22; 128/DIG. 22; 428/411.1; 428/423.5; 428/474.4; 523/112
(58) Field of Search .................. 528/310, 312, 528/313, 322, 335, 318, 315, 316; 128/DIG. 22; 427/2.1, 322, 337; 523/112; 428/411.1, 423.5, 474.4; 525/50, 54.1, 54.2, 54.22

(56) References Cited

U.S. PATENT DOCUMENTS

| | | | |
|---|---|---|---|
| 2,274,831 A | 3/1942 | Hill | |
| 2,691,643 A | 10/1954 | Chirtel et al. | |
| 2,786,045 A | 3/1957 | Chirtel et al. | |
| 2,968,629 A | 1/1961 | Thompson | 252/389 |
| 3,525,718 A | 8/1970 | Derieg et al. | |
| 4,302,368 A | * 11/1981 | Dudley et al. | 523/112 |
| 4,326,532 A | * 4/1982 | Hammer | 128/DIG. 22 |
| 4,459,132 A | 7/1984 | Kaufman et al. | 44/56 |
| 4,720,512 A | * 1/1988 | Hu et al. | 523/112 |
| 4,786,556 A | * 11/1988 | Hu et al. | 428/412 |
| 4,865,870 A | * 9/1989 | Hu et al. | 427/2.1 |
| 4,987,181 A | * 1/1991 | Bichon et al. | 525/54.1 |
| 5,292,939 A | 3/1994 | Hollingsworth | 562/515 |
| 5,319,110 A | 6/1994 | Hollingsworth | 549/313 |
| 5,374,773 A | 12/1994 | Hollingsworth | 562/515 |
| 5,641,855 A | 6/1997 | Scherr et al. | 528/310 |
| 6,056,967 A | 5/2000 | Steuerle et al. | 424/401 |
| 6,087,462 A | * 7/2000 | Bowers et al. | 526/277 |
| 6,153,724 A | * 11/2000 | Hollingsworth | 528/318 |

FOREIGN PATENT DOCUMENTS

WO    WO 00/17254    3/2000

* cited by examiner

Primary Examiner—P. Hampton-Hightower
(74) Attorney, Agent, or Firm—Quarles & Brady LLP

(57) ABSTRACT

A polyamide and a process for preparing the polyamide are disclosed. The process comprises reacting in a reaction mixture a monomer selected from unsaturated carboxylic acids, esters of unsaturated carboxylic acids, anhydrides of unsaturated carboxylic acids, and mixtures thereof, and a first amine to form an intermediate reaction product in the reaction mixture, wherein the first amine is selected from $RR_1NH$, $RNH_2$, $RR_1NH_2^+$, $RNH_3^+$ and mixtures thereof, wherein R and $R_1$ can be the same or different and each contain between about 1 and 50 carbon atoms and are optionally substituted with heteroatoms oxygen, nitrogen, sulfur, and phosphorus and combinations thereof, and reacting the intermediate reaction product and a second amine to form a polyamide, wherein the second amine is selected from $R_2R_3NH$, $R_2NH_2$, $R_2R_3NH_2^+$, $R_2NH_3^+$ and mixtures thereof wherein $R_2$ and $R_3$ can be the same or different and each contain between about 1 and 50 carbon atoms and are optionally substituted with heteroatoms oxygen, nitrogen, sulfur, and phosphorus and combinations thereof, wherein multiple of the R, $R_1$, $R_2$, and $R_3$ are in vertically aligned spaced relationship along a backbone formed by the polyamide. In one version of the invention, the monomer is selected from maleic anhydride, maleic acid esters, and mixtures thereof. In another version of the invention, the first amine is an alkylamine, such as tetradecylamine, and the second amine is a polyalkylene polyamine, such as pentaethylenehexamine. In yet another version of the invention, the first amine and the second amine are olefinic or acetylenic amines, such as the reaction products of an alkyldiamine and an acetylenic carboxylic acid. The first amine and the second amine may be the same or different depending on the desired polyamide polymer structure.

38 Claims, 9 Drawing Sheets

TWO DIMENSIONAL POLYAMIDES PREPARED FROM UNSATURATED CARBOXYLIC ACIDS AND AMINES

BACKGROUND OF THE INVENTION

1. Field of the Invention

This invention relates to polyamides prepared by reacting a monomer selected from unsaturated carboxylic acids and esters and anhydrides of unsaturated carboxylic acids, and at least one amine.

2. Description of the Related Art

It is well known that the physical properties of an organic polymeric material can be altered by introducing specific functional groups into the polymer backbone. For instance, polymeric materials that can conduct electricity, that are magnetic, or that change some property such as color or refractive index under the influence of various external factors such as light, pressure, electric fields, magnetic field, pH changes, or temperature alterations have been prepared by adding functional groups to the polymer backbone. In all of these applications, one critical requirement is that some of the functional groups along the polymer backbone be aligned in a regular repeating fashion with very high density. Polymeric materials with very different properties can be made depending on the choice of the functional groups. Electron donor-acceptor pairs can be conductive or have optical properties that are influenced by electric or magnetic fields. An array of negatively charged groups is a typical arrangement sought for conducting organic polymers where the charge carriers are metal ions and protons. Hydrogels can be formed if charges are present on the side chains. Materials with special conductive, magnetic or electro-optical properties can be fabricated from polymers having specialized aromatic side chains.

In the background section of PCT International Publication Number WO 00/17254, several methods for introducing side chains to a main chain of a polymer are discussed and critiqued. For instance, it is reported in this document that one strategy for introducing side chains to a main chain of a polymer is to add the side chains to the preformed main chain. It is noted however, that this is generally not satisfactory because of the lack of predictability and reproducibility of stoichiometry, under-derivitization for stearic reasons, difficulty in accessing the interior of the polymer, poor solubility of the polymer, and inefficient coupling reactions. It further reported in WO 00/17254 that an alternative method for introducing side chains to a main chain of a polymer is to attach the desired side chain to each monomer prior to chain formation. It is stated that this method is generally more efficient but the subsequent coupling of the monomers often requires activating groups to be attached to one or both coupling sites.

WO 00/17254 provides one solution to the aforementioned problems associated with introducing side chains to a main chain of a polymer. In WO 00/17254, there is disclosed a process for synthesizing a novel polyamide from unsaturated lactones and amines. In the polymerization reaction, the condensation of a lactone with a variety of monofunctional or bifunctional amines is followed by ring opening of the resulting lactone to give a polyamide. The resulting polyamide has a regular, sequential alignment of side chains along the polyamide backbone. The polymerization process can produce cationic, anionic or neutral polymers depending on the nature of the side chain attached to the main chain of the polymer. It is reported that the side chains can be among other things: a very long alkyl chain which generates a bipolar structure; a molecular system with special electrical properties; a polyamine with metal complexation properties; or a carboxylate with cation exchange or capture properties. The disclosed process provides a good general method for the assembly of a continuous array of side chains along a polymer backbone in a quick and efficient manner, does not require activation of groups of the monomer, does not produce any by-products that have to be eliminated, proceeds under mild conditions, is compatible with a large spectrum of functional groups including alcohols, acids, phosphate groups, sulfonates, nitrites, amides and amines, can be carried out in a wide variety of solvents from aprotic solvents to water, and uses renewable resources instead of materials derived from fossil fuels.

While the polymerization process described in WO 00/17254 provides one solution to the aforementioned problems associated with known methods for introducing side chains to a main chain of a polymer, there is one disadvantage with the polyamide polymerization process of WO 00/17254. Specifically, the starting monomers for the polymerization process can be more expensive than other commercially available monomers. Therefore, there is a need for a less costly alternative monomer that produces a polyamide having a regular, sequential alignment of side chains along the polyamide backbone. Also, there is a need for a less costly polyamide material compared to the class of polyamides disclosed in WO 00/17254.

SUMMARY OF THE INVENTION

The foregoing needs in the art are met by a polyamide prepared by reacting a monomer selected from unsaturated carboxylic acids, esters of unsaturated carboxylic acids, anhydrides of unsaturated carboxylic acids, and mixtures thereof, and a first amine to form an intermediate reaction product in the reaction mixture, wherein the first amine is selected from $RR_1NH$, $RNH_2$, $RR_1NH_2+$, $RNH_3^+$ and mixtures thereof, wherein R and $R_1$ can be the same or different and each contain between about 1 and 50 carbon atoms and are optionally substituted with heteroatoms oxygen, nitrogen, sulfur, and phosphorus and combinations thereof, and then reacting the intermediate reaction product and a second amine to form a polyamide, wherein the second amine is selected from $R_2R_3NH$, $R_2NH_2$, $R_2R_3NH_2^+$, $R_2NH_3^+$ and mixtures thereof, wherein $R_2$ and $R_3$ can be the same or different and each contain between about 1 and 50 carbon atoms and are optionally substituted with heteroatoms oxygen, nitrogen, sulfur, and phosphorus and combinations thereof, wherein multiple of the R, $R_1$, $R_2$, and $R_3$ are in vertically aligned spaced relationship along a backbone formed by the polyamide.

In one version of the invention, the monomer is selected from maleic anhydride, maleic acid esters, and mixtures thereof. In another version of the invention, the first amine is an alkylamine, such as tetradecylamine, and the second amine is a polyalkylene polyamine, such as pentaethylenehexamine. In yet another version of the invention, the first amine and the second amine are olefinic or acetylenic amines, such as the reaction products of an alkyldiamine and an acetylenic carboxylic acid. In an example embodiment of the invention, the polyamide is prepared by reacting the monomer and the first amine in a molar ratio of from 1:0.05 to 1:1 and adding the second amine in a molar ratio of monomer to second amine of from 1:0.05 to 1:1. The first amine and the second amine may be the same or different depending on the desired polyamide structure.

In one example embodiment of the invention, the polymerization process produces a polyamide of the formula:

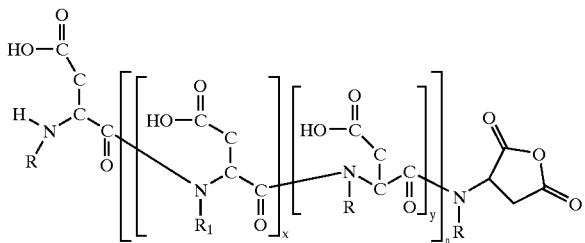

wherein n is between about 50 and 10,000, wherein x is an integer in the range of 0 to 20, wherein y is an integer in the range of 0 to 20, wherein R contains between about 1 and 50 carbon atoms and is optionally substituted with heteroatoms oxygen, nitrogen, sulfur, and phosphorus and combinations thereof, wherein $R_1$ contains between about 1 and 50 carbon atoms and is optionally substituted with heteroatoms oxygen, nitrogen, sulfur, and phosphorus and combinations thereof, wherein multiple of the R and $R_1$ are in vertically aligned spaced relationship along a backbone formed by the polyamide, and wherein R and $R_1$ are neutral, positively charged or negatively charged. In one version of the polyamide of the invention, R is alkyl. In another version of the polyamide of the invention, $R_1$ is polyalkylenyl polyamine. In yet another version of the polyamide of the invention, $R_1$ is an olefinic or acetylenic amino group.

The polyamide of the invention may be crosslinked with a crosslinking agent containing at least two functional groups capable of reacting with amino groups, such as isocyanate compounds having 2 or more —N=C=O groups, aldehyde compounds having 2 or more —CHO groups, phosphines having the general formula $(A)_2P(B)$ and mixtures thereof, wherein A is hydroxyalkyl, and B is hydroxyalkyl, alkyl, or aryl, and epoxy resins having epoxide end groups.

A polyamide in accordance with the present invention can be tailored for use in many different practical applications. For example, proper selection of two different amines for inclusion in the polymer will create a two-dimensional structure such that one side of the polyamide is non-polar or lipophilic and the other side of the polymer is polar or hydrophilic. Proper selection of the amines can also cause the polyamide to: (1) act as a hydrogel, (2) act as a flocculent, (3) provide surfaces that do not scale, (4) provide surfaces that are more bio-compatible, (5) provide surfaces that bind metals, (6) provide a reducing environment for reducing metal ions to a base metal, and (7) provide a material for use in micropatterning for electronic device manufacturing.

The polyamide, whether crosslinked or not crosslinked, is particularly useful as a coating for a substrate. In one coating application, the polyamide is used to coat a polymeric substrate which may comprise a natural polymer such as cellulose, or a synthetic polymer such as polyethylene, polypropylene, polyvinyl chloride, polyurethane, silicone rubber, polytetrafluoroethylene, or any derivative of these polymers. In another coating application, an antithrombotic agent (i.e., a material that inhibits thrombus formation), such as heparin, is bonded to the polyamide coating to produce an article suitable for medical applications in which the article contacts blood. (As used herein, "antithrombotic" and "non-thrombogenic" refer to any material which inhibits thrombus formation on a surface.) In yet another coating application, the polyamide is used to coat surfaces in order to suppress biofilm formation. In still another coating application, the polyamide is used as an thin conductive film for electronic devices. Additionally, the polyamide may be used to coat oil and gas lines.

These and other features, aspects, and advantages of the present invention will become better understood upon consideration of the following detailed description, drawings, and appended claims.

DETAILED DESCRIPTION OF THE INVENTION

Figure 1:
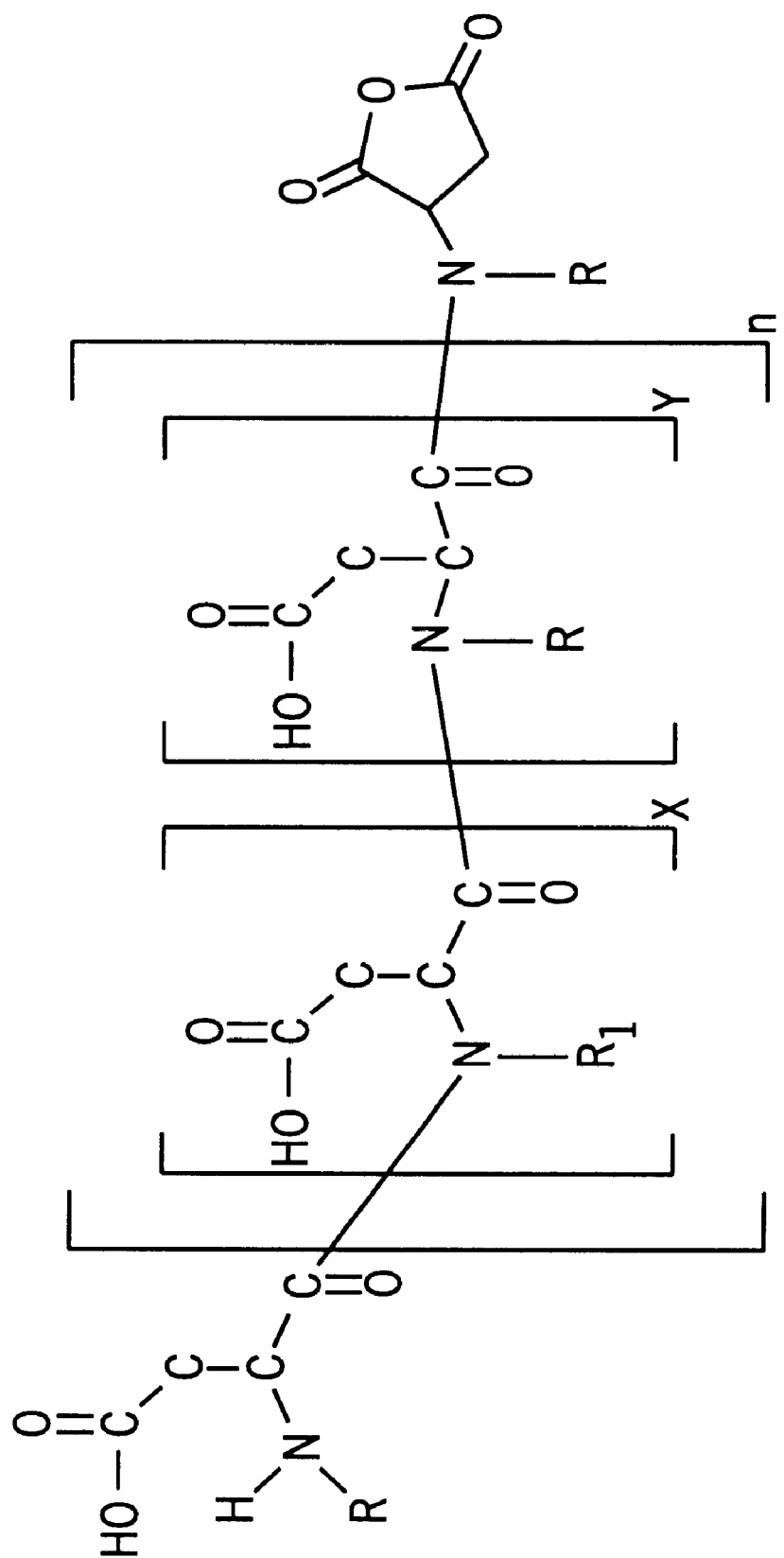
FIG. 1 shows one example embodiment of a polyamide in accordance with the present invention.

A procedure for making a polyamide in accordance with the invention involves reacting in a reaction mixture a monomer selected from unsaturated carboxylic acids, esters of unsaturated carboxylic acids, anhydrides of unsaturated carboxylic acids and mixtures thereof with a first amine to form an intermediate reaction product in the reaction mixture, wherein the first amine is selected from $RR_1NH$, $RNH_2$, $RR_1NH_2^+$, $RNH_3^+$ and mixtures thereof, wherein R and $R_1$ can be the same or different and each contain between about 1 and 50 carbon atoms and are optionally substituted with heteroatoms oxygen, nitrogen, sulfur, and phosphorus and combinations thereof. The reaction of the monomer and the first amine forms an intermediate reaction product in the reaction mixture. The intermediate reaction product is then reacted with a second amine selected from $R_2R_3NH$, $R_2NH_2$, $R_2R_3NH_2^+$, $R_2NH_3^+$ and mixtures thereof, wherein $R_2$ and $R_3$ can be the same or different and each contain between about 1 and 50 carbon atoms and are optionally substituted with heteroatoms oxygen, nitrogen, sulfur, and phosphorus and combinations thereof. The reaction of the intermediate reaction product with the second amine forms a polyamide in accordance with the invention in the reaction mixture. The polyamide may then be separated from the reaction mixture. A polyamide produced in accordance with the method of the invention includes multiple of the R, $R_1$, $R_2$, and $R_3$ groups in vertically aligned spaced relationship along a backbone formed by the polyamide.

In one example embodiment of the invention, R, $R_1$, $R_2$, and $R_3$ may be selected from alkyl, alkenyl, alkynyl, cycloalkyl, aryl, aralkyl, hydroxyl, nitrile, carboxyl, sulfate, phosphate, sulfonyl, trialkylammonium and combinations thereof and optionally can be substituted with a halogen selected from the group consisting of chlorine, iodine, bromine, fluorine and combinations thereof. The R, $R_1$, $R_2$, and $R_3$ groups may be the same or different depending on the desired structure for the final polyamide. In other words, the first amine and the second amine used in the polymerization process may be the same or different.

Suitable unsaturated carboxylic acids, esters of unsaturated carboxylic acids, and anhydrides of unsaturated carboxylic acids for use as the monomer of the present invention have for example from 3 to 18 carbon atoms in the molecule. Non-limiting examples of unsaturated carboxylic acids are acrylic acid, methacrylic acid, dimethacrylic acid, ethylacrylic acid, allylacetic acid, vinylacetic acid, maleic acid, fumaric acid, itaconic acid, methylenemalonic acid, and citraconic acid. Of this group of acids, the monocarboxylic acid, acrylic acid, and the dicarboxylic acid, maleic acid, are preferred. Non-limiting examples of esters of the unsaturated carboxylic acids are methyl acrylate, ethyl acrylate, n-propyl acrylate, isopropyl acrylate, n-butyl acrylate, isobutyl acrylate, methyl methacrylate, ethyl methacrylate, isopropyl methacrylate, n-butyl methacrylate, 2-ethylhexyl acrylate, 2-ethylhexyl methacrylate, palmityl acrylate, lauryl acrylate, diaryl acrylate, lauryl methacrylate, palmityl methacrylate, stearyl methacrylate, dimethyl maleate, ethyl maleate, isopropyl maleate, 2-hydroxyethyl acrylate, 2-hydroxyethyl methacrylate, 2-hydroxypropyl acrylate, 3-hydroxypropylacrylate, 2-hydroxypropyl methacrylate, 3-hydroxypropyl methacrylate, hydroxybutyl acrylate, hydroxybutyl methacrylate, hydroxyhexyl acrylate, methacrylate, fumaric acid esters and maleic acid esters. Of this group of esters, maleic acid monoesters are preferred, and are the preferred monomer in the present invention. A non-limiting example of anhydrides of the unsaturated carboxylic acids is maleic anhydride, which is another preferred monomer in the present invention.

Figure 2A:
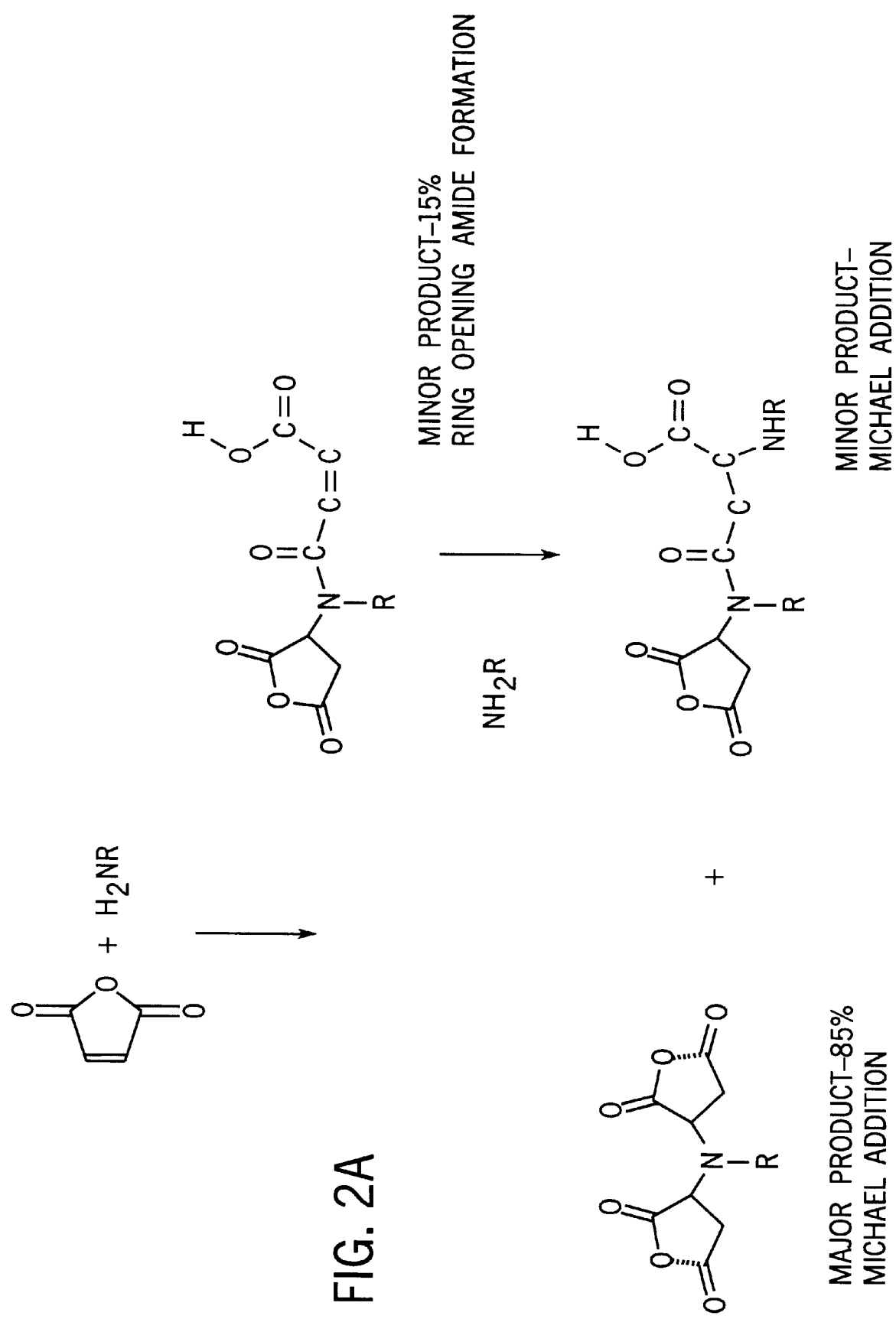
FIGS. 2A and 2B show a process for synthesizing one example embodiment of a polyamide in accordance with the present invention.
Figure 2B:
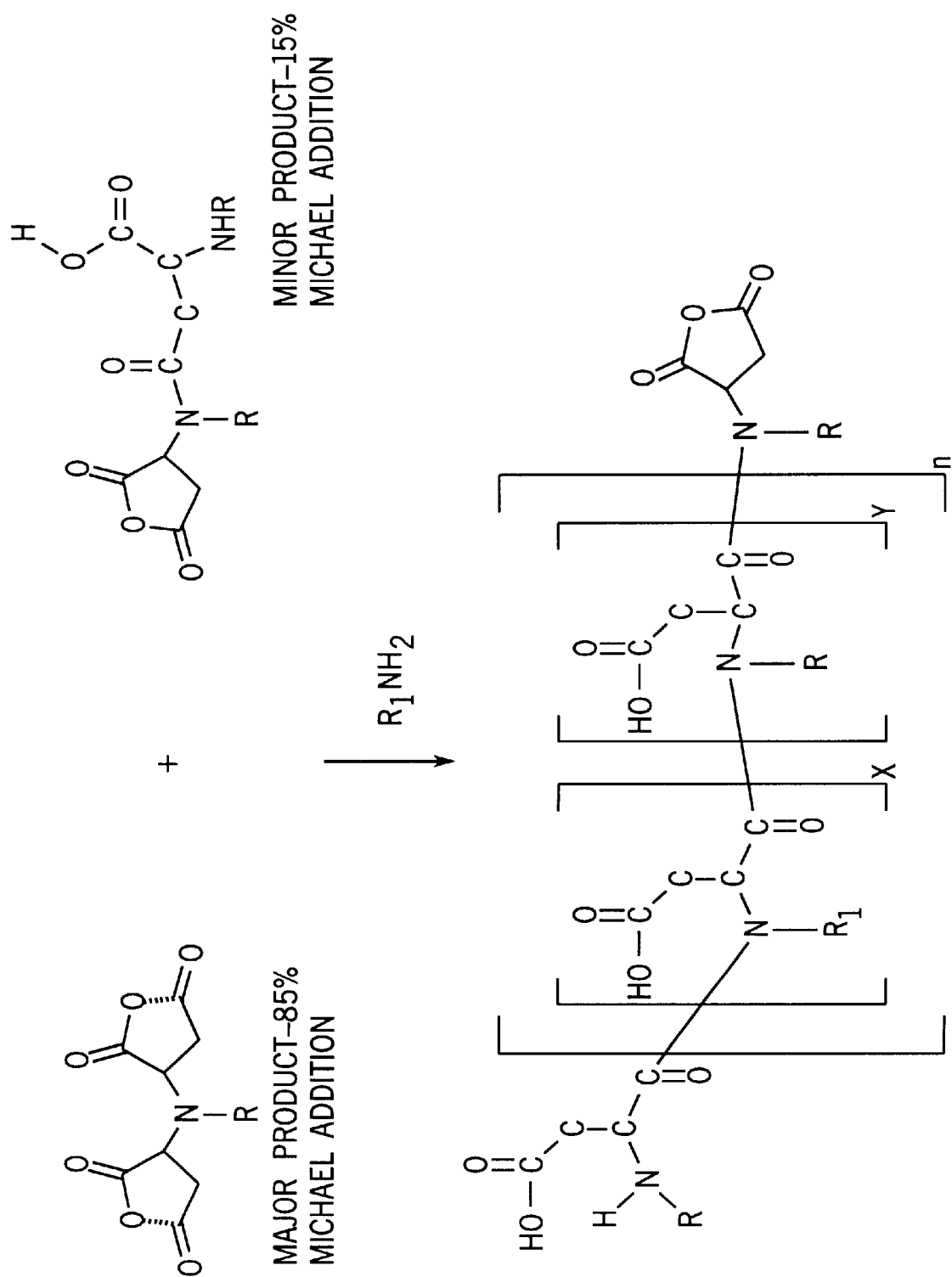

The present invention establishes general conditions for adding amines to a monomer selected from unsaturated carboxylic acids, esters of unsaturated carboxylic acids, anhydrides of unsaturated carboxylic acids and mixtures thereof to yield polyamides. The structure of one example embodiment of a polyamide produced in accordance with the present invention is shown in FIG. 1. One general mechanism for the reaction is shown in FIGS. 2A and 2B. Reaction of an anhydride of an unsaturated dicarboxylic acid, such as maleic anhydride (2,5-furandione) shown in FIG. 2A, with a first primary amine ($RNH_2$) by way of a Michael-type addition of the first amine across the double bond of the maleic anhydride yields at least one intermediate reaction product. As shown in FIG. 2A, the formation of intermediate products can take several reaction paths; however, the process in accordance with the present invention enhances the Michael-type addition reaction and minimizes the other reaction pathways by control of reaction temperatures. The primary alternate pathway is the amidation reaction before the Michael-type addition reaction as illustrated in FIG. 2A showing both major (85%) and minor (15%) intermediate reaction products. The intermediate reaction product or products are further reacted with a second primary amine to yield polyamides with structures shown in FIG. 2B wherein n is between about 50 and 10,000, x is an integer in the range of 0 to 20, and y is an integer in the range of 0 to 20.

The molecular weight of the polyamides can be controlled by adjusting the temperature and time for which the first amine and the monomer are reacted and by adjusting the temperature and time for which the second amine and the intermediate reaction product or products are reacted. The present invention also allows the properties of the polyamide compositions to be altered by controlling the degree of polymerization (average molecular weight), the length of hydrocarbon chain R and/or $R_2$ group, the degree the hydrocarbon chain is unsaturated, and combinations thereof. It should be understood that the R and $R_2$ groups of the first amine and the second amine used in the polymerization process example shown may be the same or different depending on the desired structure for the final polyamide. Preferably, the molar ratio of the monomer to the first amine is from 1:0.05 to 1:1, and the molar ratio of the monomer to the second amine is from 1:0.05 to 1:1.

Figure 3A:
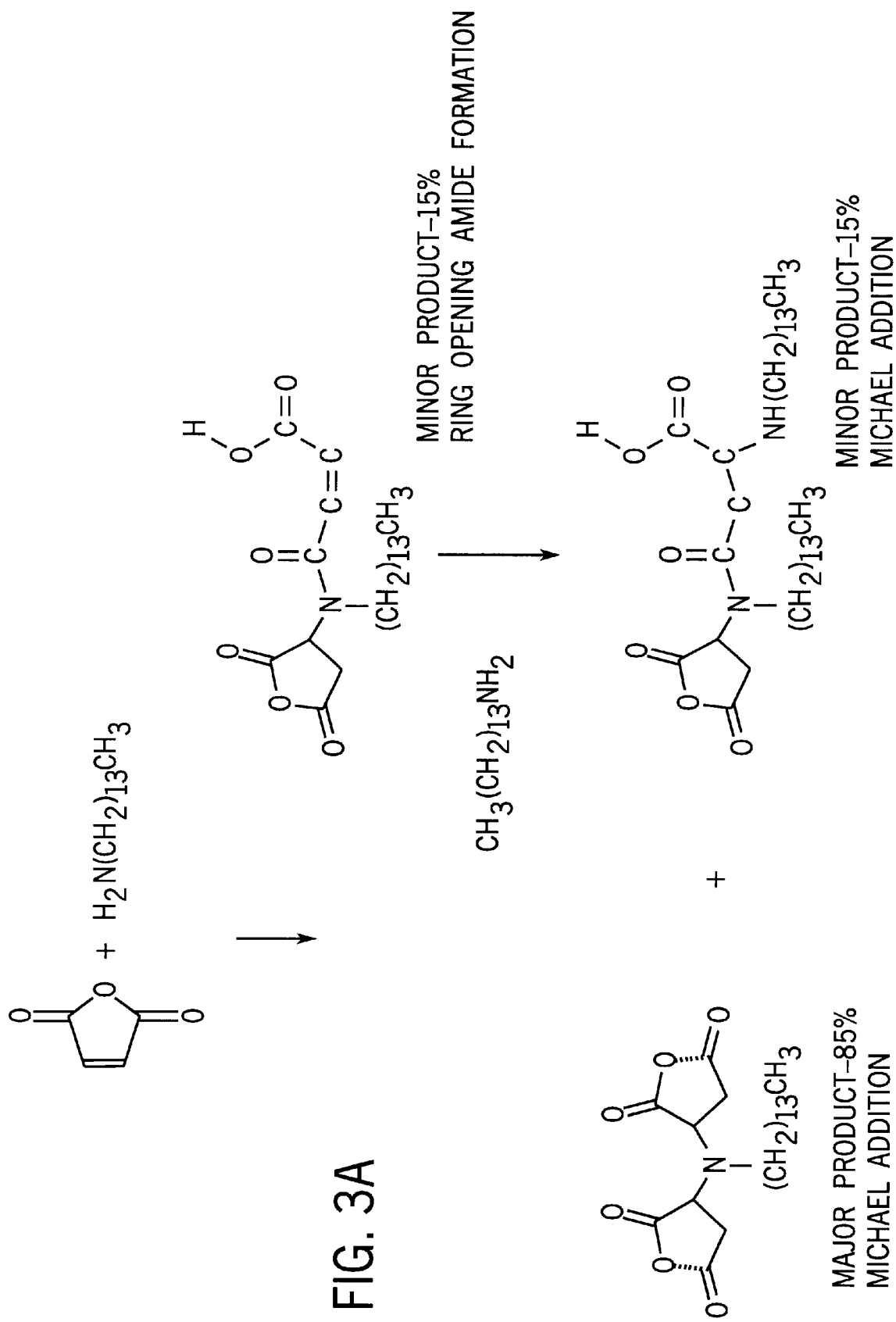
FIGS. 3A and 3B show another process for synthesizing another polyamide in accordance with the present invention.
Figure 3B:
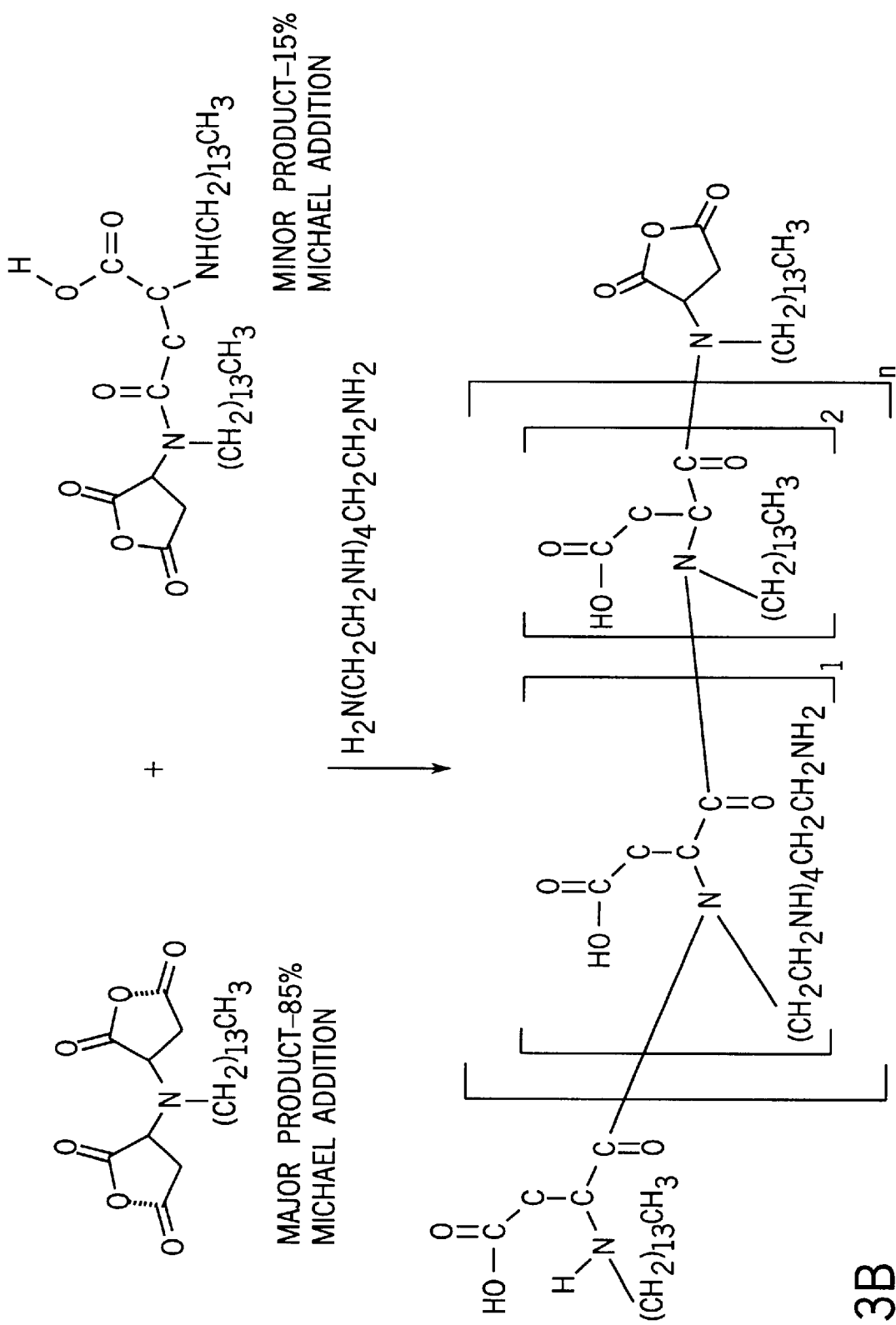

In another example embodiment of a process in accordance with the invention as shown in FIGS. 3A and 3B, an anhydride of an unsaturated dicarboxylic acid, such as maleic anhydride (2,5-furandione), or an ester of an unsaturated dicarboxylic acid, such as maleic acid monoester, is reacted with an alkylamine, such as tetradecylamine ($H_2N(CH_2)_{13}CH_3$), in a first reaction mixture. The alkylamine reacts with the maleic anhydride or maleic acid monoester by way of a Michael-type addition of the alkylamine across the double bond of the maleic anhydride or the maleic acid monoester. At least one Michael-type addition intermediate reaction product is formed in the first reaction mixture. Preferably, the double bond of the maleic anhydride or the maleic acid monoester is nearly completely removed via the Michael-type addition of the alkylamine across the double bond, and the anhydride ring (in the case of maleic anhydride) or the carboxyl group and ester group (in the case of maleic acid monoester) remain intact with minimal reaction. The intermediate reaction product is then reacted with a polyalkylene polyamine, such as pentaethylenehexamine ($H_2N(CH_2CH_2NH)_4CH_2CH_2NH_2$), in a second reaction mixture. Alternatively, the intermediate reaction product may then be reacted with a low molecular weight polyamine, such as ($H_2N(CH_2CH_2)_xCH_2CH_2NH_2$) where x=1–4, polyethylenimines, polyallylamines, and dendritic amines of generation 1–4. The pentaethylenehexamine reacts with the anhydride ring of the maleic anhydride or the carboxyl of the maleic acid monoester in an amidation reaction step in which the polyamide shown in FIG. 3B, wherein n is between about 50 and 10,000, is produced. In the example embodiment shown in FIGS. 3A and 3B, the molar ratio of maleic anhydride or maleic acid monoester to alkylamine (tetradecylamine) is 1:0.5, and the molar ratio of maleic anhydride or maleic acid monoester to polyalkylene polyamine (pentaethylenehexamine) is 1:0.25. However, the molar ratio of the maleic anhydride or maleic acid monoester to alkylamine may be from 1:0.05 to 1:1, and the molar ratio of the maleic anhydride or maleic acid monoester to polyalkylene polyamine may be from 1:0.05 to 1:1.

Figure 4A:
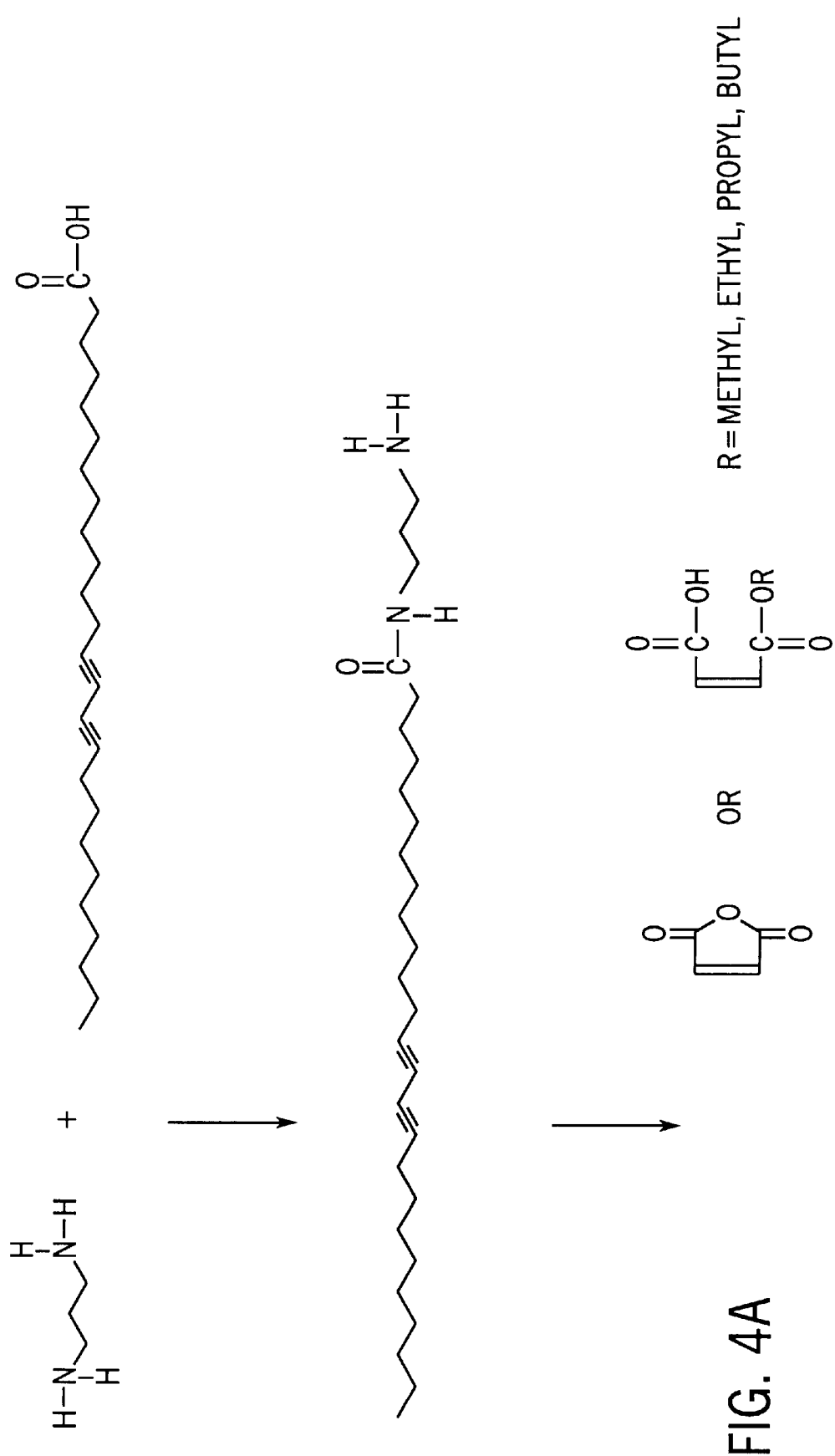
FIGS. 4A and 4B show yet another process for synthesizing yet another polyamide in accordance with the present invention.
Figure 4B:
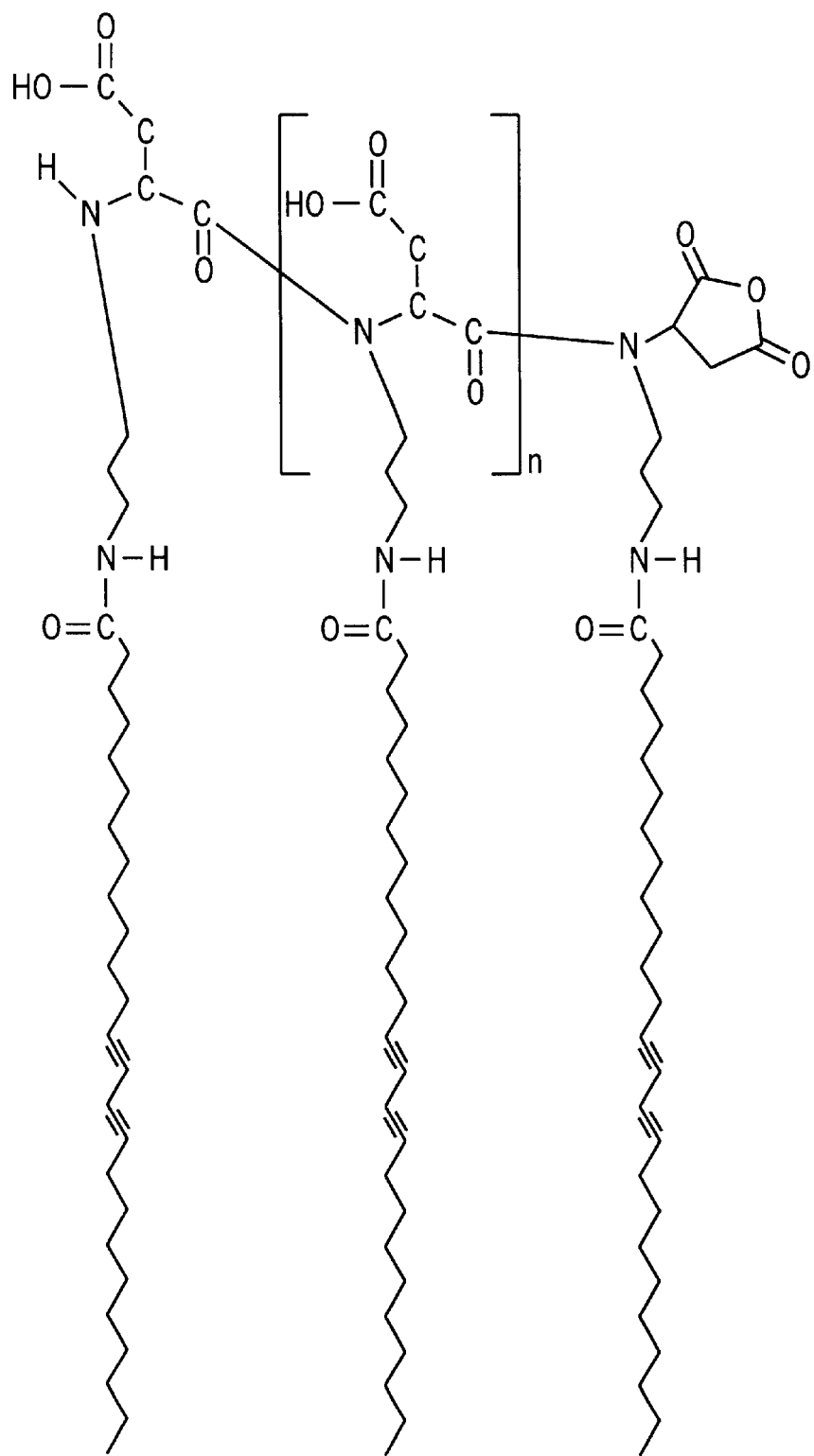

In yet another example embodiment of a process in accordance with the invention as shown in FIGS. 4A and 4B, an anhydride of an unsaturated dicarboxylic acid, such as maleic anhydride (2,5-furandione), or an ester of an unsaturated dicarboxylic acid, such as maleic acid monoester, is reacted in a first reaction mixture with a long chain unsaturated amine having a carbon chain length of $C_6$–$C_{50}$. A non-limiting example is a long chain acetylenic amine formed by reacting an alkyldiamine, such as diamino propane (shown in FIG. 4A), and an acetylenic carboxylic acid, such as 10,12-docosadiynedioic acid or 10,12-pentacosadiynoic acid (shown in FIG. 4A). The long chain acetylenic amine reacts with the maleic anhydride or maleic acid monoester by way of a Michael-type addition of the long chain acetylenic amine across the double bond of the maleic anhydride or the maleic acid monoester. At least one Michael-type addition intermediate reaction product is formed in the first reaction mixture. Preferably, the double bond of the maleic anhydride or the maleic acid monoester is nearly completely removed via the Michael-type addition of the long chain acetylenic amine across the double bond, and the anhydride ring (in the case of maleic anhydride) or the carboxyl group and ester group (in the case of maleic acid monoester) remain intact with minimal reaction. The intermediate reaction product is then reacted with further amounts of the long chain acetylenic amine in a second reaction mixture. The long chain acetylenic amine reacts with the anhydride ring of the maleic anhydride or the carboxyl of the maleic acid monoester in an amidation reaction step in which the polyamide shown in FIG. 4B, wherein n is between about 50 and 10,000, is produced. In the example embodiment shown in FIGS. 4A and 4B, the molar ratio of maleic anhydride or maleic acid monoester to long chain acetylenic amine may be from 1:0.05 to 1:1.

The polymerization process shown in FIGS. 4A and 4B is particularly advantageous as it incorporates a side chain conductive group into a polymer that provides a conductive material that is moldable and formable and that will dissolve in common solvent systems. The conductive side chain polymers as exemplified in FIG. 4B are created by using a simple material substitution in the processes of FIGS. 3A and 3B and by conducting the reaction in a light free inert atmosphere (e.g., amber glassware in a glove box, Schlenk line, or equivalent). The material substitution eliminates the long chain amine, tetradecylamine amine, and replaces it with an acetylenic or diacetylenic amine. The acetylenic or diacetylenic amine can be formed using an alkyl diamine and an acetylenic or diacetylenic carboxylic acid as shown in FIG. 4A. The acetylenic or diacetylenic side chains are typically of the same length and, therefore, can develop an order that is conducive to creating a conjugated crosslinked system.

The polymerization process shown in FIGS. 4A and 4B allows the polymer side chains or mesogens to be aligned with one another for subsequent crosslinking reactions that form the conjugated and electrically conductive polymer. This approach forms a polymer with the polar carbonyl and amide groups on one side of the polymer backbone and the less polar diacetylenic groups on the other side creating a novel two-dimensional structure. Upon crosslinking the diacetylenic groups, a novel three-dimensional network is formed with extremely well aligned mesogens that provide conductivity to electricity and that have optical activity. Since the mesogen architecture provides close contact between the mesogenic groups, there is no need for mechanical compression, conjugated crosslinker molecules, or elaborate synthesis approaches to activate the conjugated system for conductivity. In fact, each mesogen is exactly four atoms apart. The two-dimensional nature of the polymer (polar and non-polar aspects) creates a situation that forces a certain molecular configuration onto the polymer (self assembly).

The processes shown in FIGS. 2A and 2B, 3A and 3B, and 4A and 4B can be carried out in a number of different but similar ways. One approach isolates the intermediate reaction product or products between each synthesis step. Another approach uses a stepwise monomer addition without intermediate reaction product isolation. Both of these approaches provide acceptable yields of 90–95%. However, intermediate reaction product isolation allows for proper analysis of the intermediate reaction products, and may even provide more controlled polymer architecture since each step is pushed to completion before the next step is begun. Alternatively, the processes shown in FIGS. 2A and 2B, 3A and 3B, and 4A and 4B can be carried out by simultaneous addition of a long-chain amine and a polyamine, the addition of a mixture of these two amines, or reversed order of addition.

As detailed above, the polymerization process can follow several paths, however, by keeping the reaction temperatures below room temperature (i.e., below about 20° C.), the Michael-type addition reaction can be enhanced and the other reaction pathways minimized. The primary alternate pathway is the amidation reaction before Michael-type addition as illustrated in the FIG. 2A showing both major and minor products. Another reaction pathway that can lead to significant by-products is the reaction of two primary amine molecules with one maleic anhydride or one maleic acid monoester molecule to form a 2 to 1 adduct. Mass spectral data has shown the adduct as a minor constituent in the products of a polymerization process in accordance with the invention. Because of the adduct formation, a process to eliminate the adduct from the desired product was developed. Specifically, it was discovered that a polyamide as shown in FIG. 3B is soluble in isopropanol (or similar solvent such as methylene chloride) and the adduct is not. Accordingly, the clean up process is to allow the reaction to sit overnight at room temperature. The adduct precipitates and is readily filtered (e.g., by vacuum or gravity filtration) from the polymer solution.

Using the process of the present invention, cationic, anionic and neutral polymers can be made which are dependent on the nature of the side groups the R, $R_1$, $R_2$, and $R_3$. The R, $R_1$, $R_2$, and $R_3$ groups can be very long alkyl chains which generate bipolar monolayer structures in which the head group is part of a polyamide chain. The R, $R_1$, $R_2$, and $R_3$ groups can also be a molecular system with special optical or electrical properties, polyamines with high metal complexation or ion-capture properties, or carboxylates with cation exchange or capture properties. Examples of uses for polymer compositions prepared according to the method of the present invention are thin films for electronics through organic conductors, hydrogels, flocculants, nanostructures, and high-capacity ion exchange resins for use in precious or toxic metal recovery and water purification or reclamation.

The present invention is a process for synthesizing highly functionalized and functionalizable new polymeric materials capable of a wide variety of uses from monomers selected from unsaturated carboxylic acids, esters of unsaturated carboxylic acids, anhydrides of unsaturated carboxylic acids and mixtures thereof. The ability of the present invention for forming charged, neutral, hydrophobic, hydophilic, electroactive, optically active, magnetically active or other types of polymers from one generalized reaction parallels the well-known radical polymerization of alkenes to form polymers with different physical properties. The present invention provides processes for the synthesis of new and novel polymer compositions. The polymers of the present invention, when having R, $R_1$, $R_2$, and $R_3$ groups, form two-dimensional polymers wherein one end of the polymer (the headgroup which forms the backbone) is different from the other end (the R, $R_1$, $R_2$, and $R_3$ groups which form the side chains).

Applications for the polymer compositions of the present invention are, but are not limited to: (1) thin conductive films for electronic or electromagnetic devices, (2) hydrogels with high water capacity for medical and new mechanical-electrical applications, (3) conductive polymers, (4) polyamino-polyamides for metal recovery, and for use as a flocculant in water purification, (5) non-fouling surfaces for biofilm suppression, (6) non-thrombogenic surfaces, and (7) as micelles or liposome or adjuvants for drug delivery.

The polymerization reaction of the present invention involves monomers selected from unsaturated carboxylic acids, esters of unsaturated carboxylic acids, anhydrides of unsaturated carboxylic acids and mixtures thereof, and at least one substituted or unsubstituted alkyl primary amine.

The alkyl chains stack in a parallel manner and are held together by hydrophobic forces thereby forming an extended two-dimensional sheet. The terminus of the alkyl chain can be a saturated alkyl group such as methyl, isopropyl or isobutyl group, a polar group, such as hydroxyl, nitrile, or amide, or an unsaturated functional group such as an alkene, acetylene or aryl group. Furthermore, the terminal group can be any functionality that does not interfere with reaction of the amino group with the monomer. These functionalities can also appear at any position along the alkyl chains thereby giving the polymers special properties such as a band of polar groups (in the case of hydroxyl functions) or a band of stacked $\pi$ functions (in the case of alkenes, acetylenes, or arenes). These polymer compositions can be used for light or electron conduction or for conferring special magnetic or optical properties or for further polymerization. The polymers can be used to replace Langmuir Blodgett layers in most applications since the hydroxyl groups on the polar faces can be converted to a wide variety of functionalities by standard chemical techniques. These include but are not limited to acids, esters, amines, amides, nitrites, phosphates, phosphonates, sulfate, thiol, and halo groups.

The present invention particularly uses monomers selected from unsaturated carboxylic acids, esters of unsaturated carboxylic acids, anhydrides of unsaturated carboxylic acids and mixtures thereof as an agent to effect the regular, sequential alignment of side chains along a polyamide backbone. The method is based on the reactivity of the monomer which undergoes reaction with a primary amine by Michael-type addition to yield an intermediate product which is then amidized to form a polyamide chain with the pendant side chain. Depending on the R, $R_1$, $R_2$, and $R_3$ side groups, the method of the present invention can produce many different types of new compositions.

When the R, $R_1$, $R_2$, and/or $R_3$ group is a saturated long-chain alkyl group, two-dimensional polymer compositions in which the hydrophobic alkyl chains are on one face and the polar carboxyl groups on the other face are fabricated. Two-dimensional polymer compositions are prepared according to the method of the present invention by reacting a monomer selected from unsaturated carboxylic acids, esters of unsaturated carboxylic acids, anhydrides of unsaturated carboxylic acids and mixtures thereof with the appropriate long chain alkyl amine. To prepare polymer compositions with shorter chain amines that are liquid, no solvent is needed except that dilution with a high boiling point solvent such as isopropanol or toluene is preferred. To prepare compositions with long chain amines which are solids (e.g., tetradecylamine), a solvent is required to dissolve the longer chain amine. After an intermediate reaction product is formed, the intermediate product is further reacted with a second amine to form a polyamide. The polymer compositions prepared according to the method of the present invention can be used for coating plastics to render the plastics hydrophilic. The free hydroxyl groups on one side of the polymer compositions can be used as sites for functionalization for further surface modifications. The R, $R_1$, $R_2$, and/or $R_3$ groups can be polar or neutral and can range in size from a simple alcohol to a complex carbohydrate residue. When the R, $R_1$, $R_2$, and/or $R_3$ group is a carbohydrate, the polymer compositions tend to form stable gels in aqueous solution to form the polymer composition that is a two-dimensional polymer.

When the R, $R_1$, $R_2$, and/or $R_3$ group is derived from an amino acid with a neutral or anionic side chain, or is an alkyl phosphate, sulfonate, or sulfate, the polymer compositions are anionic. Anionic polymer compositions are prepared according to the method of the present invention by reacting a monomer selected from unsaturated carboxylic acids, esters of unsaturated carboxylic acids, anhydrides of unsaturated carboxylic acids and mixtures thereof with the appropriate amino acid in water or water/ethanol in the presence of sufficient base to deprotonate the amino group to form an intermediate reaction product. After an intermediate reaction product is formed, the intermediate product is further reacted with a second amine to form an anionic polyamide.

When the R, $R_1$, $R_2$, and/or $R_3$ group is a polyamine such as pentaethylenehexamine, the polymer compositions are cationic. Cationic polymer compositions are prepared according to the method of the present invention by reacting a monomer selected from unsaturated carboxylic acids, esters of unsaturated carboxylic acids, anhydrides of unsaturated carboxylic acids and mixtures thereof with the appropriate polyamine in an alcohol or ether to form an intermediate reaction product. After an intermediate reaction product is formed, the intermediate product is further reacted with a second amine to form a cationic polyamide.

When the R, $R_1$, $R_2$, and/or $R_3$ groups are a mixture of long chain aliphatic primary amines and polyamines, the polymer composition is soluble in an organic solvent but can complex metal ions and anions. The metal binding polymer composition allows solubilization of metal ions such as copper II, gold I, silver I, nickel I, and iron II and III in solvents such as chloroform or toluene.

The polymers of the present invention are two-dimensional sheets having a hydrophobic face and a hydrophilic face which have uses such as modifying the properties of the surfaces of plastics to increase wettability or biocompatibility, or waterproofing hydrophilic surfaces. Polymers that can waterproof hydrophilic surfaces are an important application for the present invention. The ability to control the surface properties of diverse materials with the polymers of the present invention is an important advance in materials and surface science. For example, by using polyunsaturated alkyl groups as the side chain R, $R_1$, $R_2$, and/or $R_3$ groups, a continuous two-dimensional sheet of $\pi$-systems are made, making it possible to fabricate planar materials with a conducting or optically active $\pi$-band for use in electronic devices such as carbon-based microchips or display devices.

Hydrogels can be made according to the present invention by synthesizing polyamides with structures which when the pH is adjusted to a low value, the polyamides become highly charged and readily form stable hydrogels which can hold many tens of times their weight of water. The properties of the hydrogels made according to the present invention can be controlled by adjusting the pH, the ionic strength of the solution, and the number of amino acids per side chain.

Hydrogels are an important material with a wide variety of uses which include artificial tissue, surgical implants, contact lens materials, grafting of foreign materials to tissue, simple drug delivery vehicles, smart drug delivery vehicles that respond to temperature or pH, enzyme immobilization matrices for biotechnological applications, vascular grafts, and mechanical-electrical substances. Hydrogels are primarily polymeric compositions that can retain a very high proportion of water. A basic structural feature of hydrogels is that the polymer backbone is hydrophilic and often charged. The hydrophilicity ensures good solvation and the charged groups cause the framework to expand because of repulsion of like charge.

Metal recovery from contaminated waste sites, industrial effluents, and spent consumer products is one of the most difficult problems faced by environmental engineers. A system that could bind metals and extract them from aqueous environments is a much desired need. The polymers of the present invention solve this need by providing polymers that are soluble in water and which bind metals in the water, producing polymer-metal complexes which then can be extracted into an organic solvent. Specifically, the aforementioned polymers are compositions that are balanced between long hydrocarbon chains and polyamido chains. The hydrocarbon chains pack together to form a two-dimensional lamellar system with the polar polyamido groups on the polar face. Such polymers can bind many transition elements which allows the elements to be extracted into organic solvents such as toluene, chloroform, ether or ethyl acetate with very high efficiency. Examples of metals that can be bound by the polymers are copper II, gold I, silver I, nickel I and iron II and II. The polymers of the present invention when complexed with a metal such as copper and gold and in an organic solvent can be deposited, painted or printed onto circuit boards or microchips to connect various elements. The solvent evaporates leaving behind the metal which can conduct electrical currents. Therefore, the polymers can be used to make conductive tracks on an insulating surface which is highly desirable for microelectronics fabrication such as microchips and circuit boards.

The polymers of the present invention represent a major step forward in coating technologies and in preparing planar materials. The polymers of the present invention can be used in the manufacture of marine paints containing metals such as copper. Copper is toxic to the growth of microorganisms and is a desired component of marine paints. However, marine paints are oil-based and the forms of copper that are soluble in organic solvents in high proportions are difficult to manufacture. Therefore in many marine paints, copper metal is used because soluble forms of copper are not available. Toluene is a common paint solvent and the polymers of the present invention comprising toluene-soluble copper solutions have much promise in manufacture of marine paints especially since the polymers form layers thus increasing the surface availability of the metal. Copper surfaces lead to less fouling than do plastic surfaces in studies involving potable water.

The area of water recovery is another area than can benefit from the polymers of the present invention. Polycationic materials such as chitosan are used as flocculants for removal of metal ions, bacteria, and viruses from water. The polymers of the present invention can be used for precious metal and radioactive metal recovery, as toluene-soluble metal complexes will allow the extraction of transition metal ions into organic solvents.

Other applications for this technology include light emitting diodes, colored back lighting for computer and television displays, elements for radar technology, new interconnects for computer circuits, conducting liquid crystals for display technology, novel sensors, organic wire, and biomedical implants.

It has been discovered that the polyamides produced according to the present invention, such as the example polyamide of FIG. 1, can be crosslinked using an isocyanate crosslinking agent. Suitable isocyanate crosslinking agents are monomeric or oligimeric molecules having 2 or more —N=C=O groups. Typically, the —N=C=O groups will crosslink the polyamide between both hydroxyl (—OH) groups and amino (—$NH_2$ or —NH—) groups on the polyamide. Polyisocyanate compounds useful for crosslinking include aliphatic and aromatic isocyanate compounds having an isocyanate functionality of at least 2. The polyisocyanate compounds can also contain other substituents which do not substantially adversely affect the reactivity of the —N=C=O groups during crosslinking of the polyamide. The polyisocyanate compound can also comprise mixtures of both aromatic and aliphatic isocyanates and isocyanate compounds having both aliphatic and aromatic character. Non-limiting examples of polyisocyanate crosslinking agents include ethylene diisocyanate, ethylidene diisocyanate, propylene diisocyanate, butylene diisocyanate, hexamethylene diisocyanate, toluene diisocyanate, cyclopentylene-1,3,-diisocyanate, cyclohexylene-1,4-diisocyanate, cyclohexylene-1,2-diisocyanate, 4,4'-diphenylmethane diisocyanate, 2,2-diphenylpropane-4,4'-diisocyanate, p-phenylene diisocyanate, m-phenylene diisocyanate, xylylene diisocyanate, 1,4-naphthalene diisocyanate, 1,5-naphthalene diisocyanate, diphenyl-4,4'-diisocyanate, azobenzene-4,4'-diisocyanate, diphenylsulphone-4,4'-diisocyanate, dichlorohexamethylene diisocyanate, furfurylidene diisocyanate, 1-chlorobenzene-2,4-diisocyanate, 4,4',4"-triisocyanatotriphenyl methane, 1,3,5-triisocyanatobenzene, 2,4,6-triisocyanato-toluene, tetramethylxylene diisocyanate, poly((phenylisocyanate)-co-formaldehyde) and mixtures thereof. The preferred isocyanate is poly (phenylisocyanate)-co-formaldehyde). The amount of polyisocyanate and the amount of polyamide used in the crosslinking process can be varied depending upon the particular crosslinking agent utilized, the reaction conditions and the particular product application contemplated. Typically, the ratio of —N=C=O groups in the polyisocyanate to the total of amount of hydroxyl groups and amino groups in the polyamide can be varied to achieve a predetermined level of crosslinking. Typically, at least 4% of the polyisocyanate to the total amount of polyamide will provide acceptable crosslinking. In one version of the invention, enough polyisocyanate is added to the polyamide such that at least 15% of the available amino and hydroxyl groups in the polyamide are crosslinked by the —N=C=O groups in the polyisocyanate.

It has also been discovered that the polyamides produced according to the present invention, such as the example polyamide of FIG. 1, can be crosslinked using a polyaldehyde crosslinking agent. Suitable polyaldehyde crosslinking agents are monomeric or oligimeric molecules having 2 or more —CHO groups. Typically, the —CHO groups will crosslink the polyamide between amino groups on the polyamide. Polyaldehyde compounds useful for crosslinking the polyamide of Formula (I) include aliphatic and aromatic polyaldehyde compounds having a polyaldehyde functionality of at least 2. The polyaldehyde compounds can also contain other substituents which do not substantially adversely affect the reactivity of the —CHO groups during crosslinking of the polyamide of Formula (I). The polyaldehyde compound can also comprise mixtures of both aromatic and aliphatic polyaldehydes and polyaldehyde compounds having both aliphatic and aromatic character. Non-limiting examples of polyaldehyde crosslinking agents include glutaraldehyde, glyoxal, succinaldehyde, 2,6-pyridenedicarboxaldehyde, and 3-methyl glutaraldehyde. The amount of polyaldehyde and the amount of polyamide used in the crosslinking process can be varied depending upon the particular crosslinking agent utilized, the reaction conditions and the particular product application contemplated. Typically, the ratio of —CHO groups in the polyaldehyde to the total of amount of amino groups in the polyamide can be varied to achieve a predetermined level of crosslinking. Typically, the percentage of polyaldehyde to the total amount of amino groups in the polyamide is about 30% to provide acceptable crosslinking. In one version of the invention, enough polyaldehyde is added to the polyamide such that at least 30% of the available amino groups in the polyamide are crosslinked by the —CHO groups in the polyaldehyde.

It has also been discovered that the polyamides produced according to the present invention, such as the example polyamide of FIG. 1, can be crosslinked using a phosphine crosslinking agent having the general formula $(A)_2P(B)$ and mixtures thereof, wherein A is hydroxyalkyl, and B is hydroxyalkyl, alkyl, or aryl. Typically, the A groups will crosslink the polyamide between amino groups on the polyamide to form a Mannich base type linkage —NH—$CH_2$—$PRR_1$, where R and $R_1$ are selected from hydroxy, methyl, hydroxyalkyl, alkyl and aryl groups. The phosphine crosslinking agent can also react with substrate to create tightly bound anchors between the polyamide coating and substrate. Non-limiting examples of phosphine crosslinking agents include tris(hydroxymethyl)phosphine, tris(1-hydroxyethyl)phosphine, tris(1-hydroxypropyl)phosphine, bis(hydroxymethyl)-alkylphosphine, and bis(hydroxymethyl)-arylphospine. The amount of phosphine crosslinking agent and the amount of polyamide used in the crosslinking process can be varied depending upon the particular crosslinking agent utilized, the reaction conditions and the particular product application contemplated. Typically, the ratio of A groups in the phosphine crosslinking agent to the total of amount of amino groups in the polyamide can be varied to achieve a predetermined level of crosslinking. Typically, the A groups in the phosphine crosslinking agent to the total of amount of amino groups in the polyamide is about 30% to provide acceptable crosslinking. In one version of the invention, enough phosphine crosslinking agent is added to the polyamide such that at least 30% of the available amino groups in the polyamide are crosslinked by the A groups in the phosphine crosslinking agent. This percentage or amount of phosphine crosslinker can be varied to obtain coatings with the desired crosslink density.

It has further been discovered that the polyamides produced according to the present invention, such as the example polyamide of FIG. 1, can be crosslinked using an epoxy crosslinking agent selected from epoxy resins having more than one epoxide group per molecule and mixtures thereof. A preferred epoxy crosslinking agent is selected from the group consisting of epoxy resins having end groups of the formula:

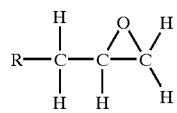

the end groups being directly attached to atoms of carbon, oxygen, nitrogen, sulfur or phosphorus, and mixtures thereof. For example, R may be bisphenol-A. Typically, the epoxy crosslinking agent will crosslink the polyamide between amino groups on the polyamide. The crosslinks are formed by attack at the epoxide rings by the amine proton which opens the epoxide ring forming an —OH group and forming a covalent crosslink between the amine (or amide) and the terminal epoxide carbon. Non-limiting examples of epoxy crosslinking agents include polyglycidyl ethers obtainable by reaction of a compound containing at least two free alcoholic hydroxyl and/or phenolic hydroxyl groups per molecule with epichlorohydrin under alkaline conditions. These polyglycidyl ethers may be made from acyclic alcohols, such as ethylene glycol, diethylene glycol, and higher poly(oxyethylene) glycols; from cycloaliphatic alcohols, such as cyclohexanol and 1,2-cyclohexanediol; from alcohols having aromatic nuclei, such as N,N-bis(2-hydroxyethyl)aniline; from mononuclear phenols, such as resorcinol and hydroquinone; and from polynuclear phenols, such as bis(4-hydroxyphenyl)methane, 4,4'-dihydroxydiphenyl, bis(4-hydroxyphenyl) sulphone, 1,1,2,2-tetrakis(4-hydroxyphenyl)ethane, and 2,2,-bis(4-hydroxyphenyl)propane (otherwise known as bisphenol A). Most preferably, the epoxy crosslinking agent is a bisphenol-A glycidyl ether terminated resin. The amount of epoxy crosslinking agent and the amount of polyamide used in the crosslinking process can be varied depending upon the particular crosslinking agent utilized, the reaction conditions and the particular product application contemplated. Typically, the ratio of epoxide groups in the epoxy crosslinking agent to the total of amount of amino groups in the polyamide can be varied to achieve a predetermined level of crosslinking. Typically, the epoxide groups in the epoxy crosslinking agent to the total of amount of amino groups in the polyamide is about 20% to provide acceptable crosslinking. In one version of the invention, enough epoxy crosslinking agent is added to the polyamide such that at least 20% of the available amino groups in the polyamide are crosslinked by the epoxide groups in the epoxy crosslinking agent. This percentage or amount of epoxy crosslinker can be varied to obtain coatings with the desired crosslink density for various applications. For instance, the polyamide coating can accept a non-thrombogenic coating formulation and can be loaded with metal powder to form a conducting coating for interconnect applications.

Polyamides produced according to the present invention, such as the example polyamide of FIG. 1, may be crosslinked using any of the above crosslinking agents by preparing a solution of the polyamide and adding the crosslinking agent to the solution. Typically, the polyamide may be dissolved using non-polar or polar solvents, and the crosslinking reaction can proceed without applying heat to the solution. In one version of the invention, the crosslinked polyamide material is applied to a substrate while still in solution and the substrate is heated to complete the crosslinking process and create a crosslinked polyamide material coating on the substrate.

In one particular application of the crosslinked polyamide material, a coating of the crosslinked polyamide material is deposited on the surface of a substrate and the coating is further coated with an antithrombotic agent, such as heparin, to produce an article suitable for medical applications in which the article contacts blood. The crosslinked polyamide material coating provides a secure coating that will not rub off of the substrate thereby assuring that the antithrombotic agent remains on the substrate and the substrate maintains its non-thrombogenic properties. The substrate may comprise metal, glass, a natural polymer such as cellulose, or a synthetic polymer such as polyethylene, polypropylene, polyvinyl chloride, polyurethane, silicone rubber or polytetrafluoroethylene.

EXAMPLES

The following examples serve to further illustrate the invention. Examples 1–4 detail the preparation of an intermediate suitable for preparing a polyamide in accordance with the invention. Examples 5 and 6 illustrate the preparation of a polyamide in accordance with the invention using intermediates prepared in Examples 1 and 4. The examples are not intended to limit the invention in any way.

Example 1
Preparation of an Intermediate

Figure 5A:
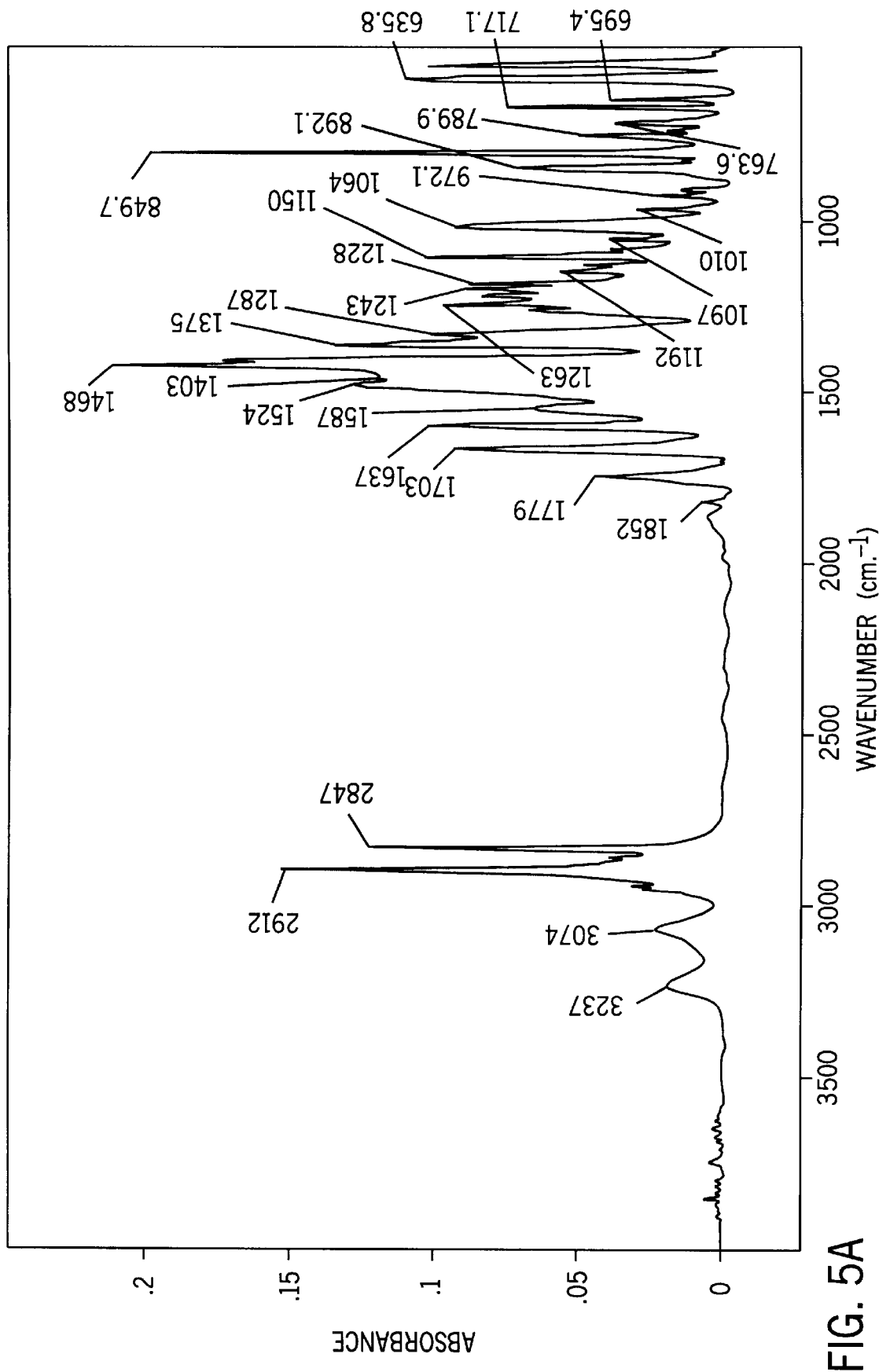
FIG. 5A shows a Fourier Transform-infrared Analysis (FT-IR) after the production of an intermediate reaction product in accordance with the invention.

An intermediate that can be used to form a polyamide in accordance with the present invention was prepared using a Michael-type addition reaction as follows. First, 98.1 grams of commercially available maleic anhydride (1.0 moles) was dissolved in 100 grams of isopropanol in a break away resin kettle. The kettle containing the maleic anhydride/isopropanol solution was then cooled in an ice bath with agitation. Second, 106.7 grams of commercially available tetradecylamine (0.5 moles) was dissolved in 200 grams of isopropanol and added slowly to the cooled maleic anhydride solution with stirring. A Michael-type addition reaction product began to precipitate within 5 minutes. The tetradecylamine addition required about two hours, and the ice bath conditions were maintained for one hour after the tetradecylamine addition. The intermediate reaction product was isolated and analyzed via Fourier Transform-Infrared Analysis (FT-IR) and Differential Scanning Calorimetry (DSC) analysis. The FT-IR analysis is shown in FIG. 5A, and shows that the anhydride ring remained intact with minimal reaction at the anhydride group and that the double bond in the maleic anhydride was nearly completely removed via the Michael-type addition of the tetradecylamine across the double bond of the maleic anhydride. (A peak explanation for FIG. 5A can be found in Table 1 below.) The DSC analysis showed that a new material with a melting point of 103.67° C. was formed, and that a small amount of unreacted maleic anhydride (melting point=55° C.) remained.

TABLE 1

Figure 5B:
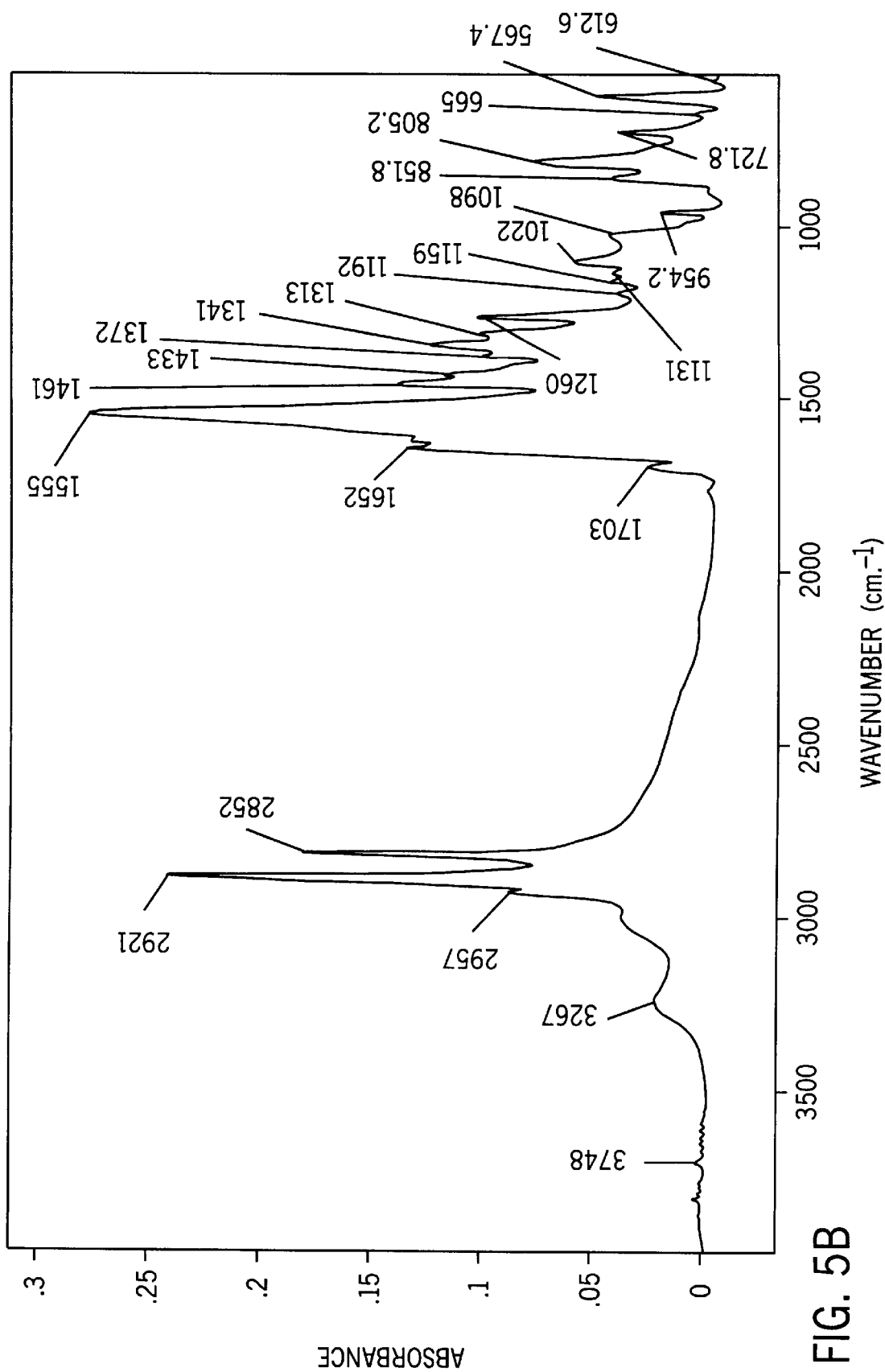
FIG. 5B shows a Fourier Transform-Infrared Analysis (FT-IR) after the production of a polyamide in accordance with the invention.

Peak Explanation for FIGS. 5A and 5B.

| Group | Functionality | Wavelength (cm$^{-1}$) |
| --- | --- | --- |
| Amine | N—H | 3200–3300 |
| Methyl and Methylene | C—H | 2845–3000 |
| Anhydride | C=O | 1852 |
| Anhydride | C=O | 1779 |
| Free Acid Group | C=O | 1703 |
| Amide | C=O | 1637 |
| Amide | C—N | 1587 |
| Methyl and Methylene | C—H | 1468 |
| Amide | C—N | 1263 |
| Data collected using the ATR cell (attenuated total reflection cell) with a zinc selenide crystal. The sample is placed on the crystal as a solution from the reactor without pretreatment. | | Typical collection routine: resolution −4, gain −1.5, 128 scans, and a 5 minute dry air purge. |

Example 2
Preparation of Another Intermediate

An intermediate that can be used to form a polyamide in accordance with the present invention was prepared using a Michael-type addition reaction as follows. First, 98.1 grams of commercially available maleic anhydride (1.0 moles) was dissolved in 100 grams of isopropanol in a break away resin kettle. The kettle containing the maleic anhydride/isopropanol solution was then cooled in an ice bath with agitation. Second, 53.4 grams of commercially available tetradecylamine (0.25 moles) was dissolved in 100 grams of isopropanol and added slowly to the cooled maleic anhydride solution with stirring. A Michael-type addition reaction product began to precipitate within 5 minutes. The tetradecylamine addition required about two hours, and the ice bath conditions were maintained for one hour after the tetradecylamine addition. The intermediate reaction product was isolated and analyzed via Fourier Transform-Infrared Analysis (FT-IR) and Differential Scanning Calorimetry (DSC) analysis. The FT-IR analysis showed that the anhydride ring remained intact with minimal reaction at the anhydride group. The FT-IR analysis also showed that the double bond in the maleic anhydride was nearly completely removed via the Michael-type addition of the tetradecylamine across the double bond of the maleic anhydride. The DSC analysis showed that a new material with a melting point of 102.11° C. was formed, and that a small amount of unreacted maleic anhydride (melting point=55° C.) remained.

Example 3
Preparation of Yet Another Intermediate

An intermediate that can be used to form a polyamide in accordance with the present invention was prepared using a Michael-type addition reaction as follows. First, 98.1 grams of commercially available maleic anhydride (1.0 moles) was dissolved in 100 grams of isopropanol in a break away resin kettle. The kettle containing the maleic anhydride/isopropanol solution was then cooled in an ice bath with agitation. Second, 21.3 grams of commercially available tetradecylamine (0.1 moles) was dissolved in 50 grams of isopropanol and added slowly to the cooled maleic anhydride solution with stirring. A Michael-type addition reaction product began to precipitate within 5 minutes. The tetradecylamine addition required about two hours, and the ice bath conditions were maintained for one hour after the tetradecylamine addition. The intermediate reaction product was isolated and analyzed via Fourier Transform-Infrared Analysis (FT-IR) and Differential Scanning Calorimetry (DSC) analysis. The FT-IR analysis showed that the anhydride ring remained intact with minimal reaction at the anhydride group. The FT-IR analysis also showed that the double bond in the maleic anhydride was nearly completely removed via the Michael-type addition of the tetradecylamine across the double bond of the maleic anhydride. The DSC analysis showed that a new material with a melting point of 95.46° C was formed, and that a small amount of unreacted maleic anhydride (melting point =55° C.) remained.

Example 4
Preparation of Still Another Intermediate

An intermediate that can be used to form a polyamide in accordance with the present invention was prepared using a Michael-type addition reaction as follows. First, 98.1 grams of commercially available maleic anhydride (1.0 moles) was dissolved in 100 grams of isopropanol in a break away resin kettle. The kettle containing the maleic anhydride/isopropanol solution was then cooled in an ice bath with agitation. Second, 160.1 grams of commercially available tetradecylamine (0.75 moles) was dissolved in 250 grams of isopropanol and added slowly to the cooled maleic anhydride solution with stirring. A Michael-type addition reaction product began to precipitate within 5 minutes. The tetradecylamine addition required about two hours, and the ice bath conditions were maintained for one hour after the tetradecylamine addition.

Example 5
Preparation of a Polymer in Accordance with the Invention

The intermediate reaction product prepared in Example 1 was used to form a polyamide in accordance with the present invention using an amidation reaction as follows. First, 102 grams of the intermediate reaction product prepared in Example 1 was dissolved in isopropanol. Second, 29.1 grams of commercially available pentaethylenehexamine (PEHA) was added drop wise to the intermediate reaction product/isopropanol mixture over a two hour period. The amount of PEHA charged is determined from the monomer charge from the formation of intermediate. After complete addition of the PEHA, the reaction kettle was removed from the cold bath with continuous stirring for another 2 hours. The polymer product was isolated and analyzed via Fourier Transform-Infrared analysis (FT-IR), Differential Scanning Calorimetry (DSC) analysis, and size exclusion chromatography. The FT-IR data as shown in FIG. 5B clearly demonstrated the loss of the anhydride ring and the formation of amide carbonyl groups (amide 1 C=O stretching mode) and the formation of amide C—N bonds (amide II C—N stretching mode). There were also lesser amounts of acid carbonyl groups present (carbonyl C=O stretching above 1700 cm$^{-1}$). A peak explanation for FIG. 5B can be found in Table 1 above. The DSC data clearly showed a glass transition temperature (Tg) at 163° C. followed by a large melting transition at 221° C. for the maleic anhydride/tetradecylamine/pentaethylenehexamine polymer product. The size exclusion chromatography data indicated a molecular weight ($M_W$) of at least 50,000 Daltons for the polymer product. This product is isolated by filtration from insoluble byproducts. Percent yields are determined by weighing the filtered product after the solvent has been removed by vacuum distillation.

Example 6
Preparation of Another Polymer in Accordance with the Invention

The intermediate reaction product prepared in Example 4 was used to form a polyamide in accordance with the present invention using an amidation reaction as follows. First, 130 grams of the intermediate reaction product prepared in Example 4 was dissolved in isopropanol. Second, 29.1 grams of commercially available pentaethylenehexamine (PEHA) was added drop wise to the intermediate reaction product/isopropanol mixture over a two hour period. After complete addition of the PEHA, the reaction kettle was removed from the cold bath with continuous stirring for another 2 hours. The polymer product was isolated and analyzed via Fourier Transform-Infrared analysis (FT-IR), Differential Scanning Calorimetry (DSC) analysis, and size exclusion chromatography. The FT-IR data clearly demonstrated the loss of the anhydride ring and the formation of amide carbonyl groups (amide 1 C=O stretching mode) and the formation of amide C—N bonds (amide II C—N stretching mode). There were also lesser amounts of acid carbonyl groups present (carbonyl C=O stretching above 1700 cm$^{-1}$). The DSC data clearly showed a glass transition temperature (Tg) at 98.5° C. and a melt temperature of about 150° C. for the maleic anhydride/tetradecylamine/pentaethylenehexamine polymer product. The size exclusion chromatography data indicated a molecular weight ($M_W$) of at least 50,000 Daltons for the polymer product.

Thus, it can be seen that the present invention provides a polymerization process that produces a new polyamide having a regular, sequential alignment of side chains along the polyamide backbone. The polymerization process of the present invention also satisfies the need for a less costly polyamide material compared to prior polyamides.

Although the present invention has been described in considerable detail with reference to certain embodiments, one skilled in the art will appreciate that the present invention can be practiced by other than the described embodiments, which have been presented for purposes of illustration and not of limitation. Therefore, the scope of the appended claims should not be limited to the description of the embodiments contained herein.

What is claimed is:

1. A process for the preparation of a polyamide, the process comprising:
    (a) reacting in a reaction mixture a monomer selected from unsaturated carboxylic acids, esters of unsaturated carboxylic acids, anhydrides of unsaturated carboxylic acids, and mixtures thereof, and a first amine to form an intermediate reaction product in the reaction mixture, wherein the first amine is selected from $RR_1NH$, $RNH_2$, $RR_1NH_2^+$, $RNH_3^+$ and mixtures thereof, wherein R and $R_1$ can be the same or different and each contain between about 1 and 50 carbon atoms and are optionally substituted with heteroatoms oxygen, nitrogen, sulfur, and phosphorus and combinations thereof; and
    (b) reacting the intermediate reaction product and a second amine to form a polyamide, wherein the second amine is selected from $R_2R_3NH$, $R_2NH_2$, $R_2R_3NH_2^+$, $R_2NH_3^+$ and mixtures thereof, wherein $R_2$ and $R_3$ can be the same or different and each contain between about 1 and 50 carbon atoms and are optionally substituted with heteroatoms oxygen, nitrogen, sulfur, and phosphorus and combinations thereof,
    wherein multiple of the R, $R_1$, $R_2$, and $R_3$ are in vertically aligned spaced relationship along a backbone formed by the polyamide.

2. The process of claim 1 wherein R, $R_1$, $R_2$, and $R_3$ are selected from alkyl, alkenyl, alkynyl, cycloalkyl, aryl, aralkyl, hydroxyl, nitrile, carboxyl, sulfate, phosphate, sulfonyl, trialkylammonium and combinations thereof and optionally can be substituted with a halogen selected from the group consisting of chlorine, iodine, bromine, fluorine and combinations thereof.

3. The process of claim 1 wherein R, $R_1$, $R_2$, and $R_3$ are alkyl.

4. The process of claim 1 wherein the first amine is tetradecylamine.

5. The process of claim 1 wherein the second amine is a polyalkylene polyamine.

6. The process of claim 5 wherein the polyalkylene polyamine is pentaethylenehexamine.

7. The process of claim 1 wherein the first amine and the second amine are reaction products of an alkyldiamine and an acetylenic carboxylic acid.

8. The process of claim 7 wherein the alkyldiamine is diamino propane and the acetylenic carboxylic acid is selected from 10,12-docosadiynedioic acid and 10,12-pentacosadiynoic acid.

9. The process of claim 1 wherein the monomer is selected from unsaturated dicarboxylic acids, esters of unsaturated dicarboxylic acids, anhydrides of unsaturated dicarboxylic acids, and mixtures thereof.

10. The process of claim 9 wherein the monomer is selected from maleic anhydride, maleic acid esters, and mixtures thereof.

11. The process of claim 1 wherein the monomer is dissolved in a solvent and cooled below about 20° C. before addition of the first amine.

12. The process of claim 11 wherein the solvent is isopropanol, the intermediate reaction product includes an adduct of the monomer, and the adduct is insoluble in isopropanol, and the process further comprises separating the adduct from the reaction mixture and reacting the intermediate reaction product and the second amine in a second reaction mixture.

13. The process of claim 1 wherein the molar ratio of the monomer to the first amine is from 1:0.05 to 1:1.

14. The process of claim 13 wherein the molar ratio of the monomer to the second amine is from 1:0.05 to 1:1.

15. The process of claim 1 wherein the process further comprises separating the intermediate reaction product from the reaction mixture and reacting the intermediate reaction product and the second amine in a second reaction mixture.

16. A process for the preparation of a polyamide, the process comprising:
   (a) reacting in a reaction mixture a monomer selected from maleic anhydride, maleic acid esters, and mixtures thereof, and a first amine having the formula R—$NH_2$ to form an intermediate reaction product in the reaction mixture, wherein R is a substituted or unsubstituted alkyl group containing between about 1 and 50 carbon atoms;
   (b) reacting the intermediate reaction product and a second amine having the formula $H_2N$—$R_1$—$NH_2$ to form a polyamide, wherein $R_1$ contains between 1 and 50 carbon atoms and is optionally substituted with heteroatoms oxygen, nitrogen, sulfur, and phosphorus and combinations thereof,
   wherein multiple of the R and $R_1$ are in vertically aligned spaced relationship along a backbone formed by the polyamide.

17. The process of claim 16 wherein the second amine is a polyalkylene polyamine.

18. The process of claim 17 wherein
   the molar ratio of the monomer to the first amine is from 1:0.05 to 1:1, and
   the molar ratio of the monomer to the second amine is from 1:0.05 to 1:1.

19. A process for the preparation of a polyamide, the process comprising:
   (a) reacting in a reaction mixture a monomer selected from maleic anhydride, maleic acid esters, and mixtures thereof, and an amine having the formula R—$NH_2$ to form an intermediate reaction product, wherein R is an acetylenic group containing between 1 and 50 carbon atoms and is optionally substituted with heteroatoms oxygen, nitrogen, sulfur, and phosphorus and combinations thereof; and
   (b) reacting the intermediate reaction product and the amine to form a polyamide polymer,
   wherein multiple of the R are in vertically aligned spaced relationship along a backbone formed by the polyamide.

20. The process of claim 19 wherein the molar ratio of the monomer to the amine is from 1:0.05 to 1:1.

21. A polyamide polymer of the formula:

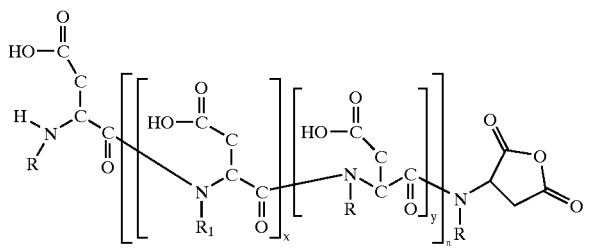

wherein n is between about 50 and 10,000,
wherein x is an integer in the range of 0 to 20,
wherein y is an integer in the range of 0 to 20,
wherein R contains between about 1 and 50 carbon atoms and is optionally substituted with heteroatoms oxygen, nitrogen, sulfur, and phosphorus and combinations thereof,
wherein $R_1$ contains between about 1 and 50 carbon atoms and is optionally substituted with heteroatoms oxygen, nitrogen, sulfur, and phosphorus and combinations thereof,
wherein multiple of the R and $R_1$ are in vertically aligned spaced relationship along a backbone formed by the polyamide, and
wherein R and $R_1$ are neutral, positively charged or negatively charged.

22. The polyamide polymer of claim 21 wherein R is selected from alkyl, alkenyl, alkynyl, cycloalkyl, aryl, aralkyl, hydroxyl, nitrile, carboxyl, sulfate, phosphate, sulfonyl, trialkylammonium and combinations thereof and optionally can be substituted with a halogen selected from the group consisting of chlorine, iodine, bromine, fluorine and combinations thereof.

23. The polyamide polymer of claim 21 wherein R is alkyl.

24. The polyamide polymer of claim 23 wherein R is tetradecyl.

25. The polyamide polymer of claim 21 wherein $R_1$ is selected from alkyl, alkenyl, alkynyl, cycloalkyl, aryl, aralkyl, hydroxyl, nitrile, carboxyl, sulfate, phosphate, sulfonyl, trialkylammonium and combinations thereof and optionally can be substituted with a halogen selected from the group consisting of chlorine, iodine, bromine, fluorine and combinations thereof.

26. The polyamide polymer of claim 21 wherein $R_1$ is polyalkylenyl polyamine.

27. The polyamide polymer of claim 26 wherein $R_1$ is a pentaethylenyl pentamine group.

28. The polyamide polymer of claim 21 wherein $R_1$ is an olefinic or acetylenic amino group.

29. The polyamide polymer of claim 28 wherein $R_1$ is an amino group formed from the reaction product of an alkyldiamine and an acetylenic carboxylic acid.

30. The polyamide polymer of claim 29 wherein $R_1$ is an amino group formed from the reaction product of diamino propane and an acetylenic carboxylic acid selected from 10,12-docosadiynedioic acid and 10,12-pentacosadiynoic acid.

31. A polyamide polymeric material comprising a crosslinked chemical combination of
   a polyamide polymer of the formula:

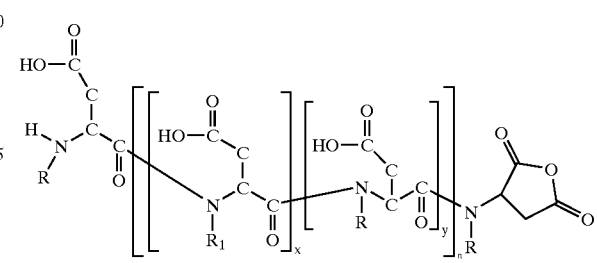

wherein n is between about 50 and 10,000,
wherein x is an integer in the range of 0 to 20,
wherein y is an integer in the range of 0 to 20,
wherein R contains between about 1 and 50 carbon atoms and is optionally substituted with heteroatoms oxygen, nitrogen, sulfur, and phosphorus and combinations thereof, wherein $R_1$ contains between about 1 and 50 carbon atoms and is optionally substituted with heteroatoms oxygen, nitrogen, sulfur, and phosphorus and combinations thereof, wherein multiple of the R and $R_1$ are in vertically aligned spaced relationship along a backbone formed by the polyamide, and wherein two or more of the R and $R_1$ contain an amino group; and a crosslinking agent containing at least two functional groups that react with amino groups.

32. The polyamide polymeric material of claim 31 wherein:

the crosslinking agent is selected from the group consisting of aliphatic isocyanate compounds having 2 or more —N=C=O groups, aromatic isocyanate compounds having 2 or more —N=C=O groups, and mixtures thereof.

33. The polyamide polymeric material of claim 31 wherein:

the crosslinking agent is selected from the group consisting of aliphatic aldehyde compounds having 2 or more —CHO groups, aromatic aldehyde compounds having 2 or more —CHO groups, and mixtures thereof.

34. The polyamide polymeric material of claim 31 wherein:

the crosslinking agent is selected from the group consisting of phosphines having the general formula $(A)_2P(B)$ and mixtures thereof, wherein A is hydroxyalkyl, and B is hydroxyalkyl, alkyl, or aryl.

35. The polyamide polymeric material of claim 31 wherein:

the crosslinking agent is selected from the group consisting of epoxy resins having end groups of the formula:

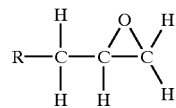

the end groups being directly attached to atoms of carbon, oxygen, nitrogen, sulfur or phosphorus, and mixtures thereof.

36. A polyamide coated article comprising:

a substrate; and a coating of the polymer of claim 31 bonded to the substrate.

37. The article of claim 36 further comprising:

an antithrombotic agent bonded to the coating.

38. The article of claim 37 wherein:

the antithrombotic agent is heparin.

* * * * *

UNITED STATES PATENT AND TRADEMARK OFFICE
CERTIFICATE OF CORRECTION

PATENT NO.    : 6,495,657 B1
DATED         : December 17, 2002
INVENTOR(S)   : William F. McDonald et al.

It is certified that error appears in the above-identified patent and that said Letters Patent is hereby corrected as shown below:

<u>Column 18,</u>
Line 62, delete "." after "C".

<u>Column 20,</u>
Line 39, delete "alky-ldiamine" and in its place insert -- alkyl-diamine --.

Signed and Sealed this

Tenth Day of June, 2003

JAMES E. ROGAN
*Director of the United States Patent and Trademark Office*

UNITED STATES PATENT AND TRADEMARK OFFICE
CERTIFICATE OF CORRECTION

PATENT NO. : 6,495,657 B1
DATED : December 17, 2002
INVENTOR(S) : William McDonald et al.

It is certified that error appears in the above-identified patent and that said Letters Patent is hereby corrected as shown below:

<u>Column 1,</u>
Line 5, please insert
-- STATEMENT REGARDING FEDERALLY SPONSORED RESEARCH OR DEVELOPMENT
This Invention was made with Government support under NREL Subcontract NO. XXE-9-29058-01, Prime Contract No. DE-AC36-98GO10337 awarded by the Department of Energy. The Government has certain rights in this invention. --

Signed and Sealed this

Twelfth Day of August, 2003

JAMES E. ROGAN
*Director of the United States Patent and Trademark Office*